United States Patent [19]

Abadi

[11] Patent Number: 4,595,517
[45] Date of Patent: Jun. 17, 1986

[54] COMPOSITION FOR REMOVING SCALE FROM A SURFACE COMPRISING ALPHA-HYDROXY CARBOXYLIC ACID AND THICKENER

[76] Inventor: Khodabandeh Abadi, 5719 N. Camino Del Conde, Tucson, Ariz. 85718

[21] Appl. No.: 526,016

[22] Filed: Aug. 24, 1983

[51] Int. Cl.[4] .................. C02F 5/10; C23F 11/10; C23G 1/02
[52] U.S. Cl. .................... 252/82; 252/87; 252/135; 252/142; 252/146; 252/174.17; 252/174.18; 252/180; 252/181
[58] Field of Search ............ 252/82, 87, 135, 142, 252/146, 174.17, 174.18, 180, 181

[56] References Cited

U.S. PATENT DOCUMENTS

| | | | |
|---|---|---|---|
| 2,994,664 | 8/1961 | Wachter | 252/87 |
| 3,003,899 | 10/1961 | Eberhard et al. | 252/142 |
| 3,041,285 | 6/1962 | Newman | 252/142 |
| 3,397,149 | 8/1968 | Gruber | 252/181 |
| 3,639,278 | 2/1972 | Hwa | 252/82 X |
| 3,639,279 | 2/1972 | Gardner et al. | 252/82 X |
| 3,766,077 | 10/1973 | Hwa et al. | 252/181 X |
| 4,435,303 | 3/1984 | Abadi | 252/80 |

*Primary Examiner*—John E. Kittle
*Assistant Examiner*—Mukund J. Shah
*Attorney, Agent, or Firm*—Thomas H. Whaley

[57] ABSTRACT

The present invention is directed to a composition which includes an aliphatic alpha-hydroxy carboxylic acid, a gum or polymeric thickener which is soluble in water at a pH of about 3 or less and optionally sodium silicate. The composition may be employed in removing scale from a surface.

16 Claims, 7 Drawing Figures

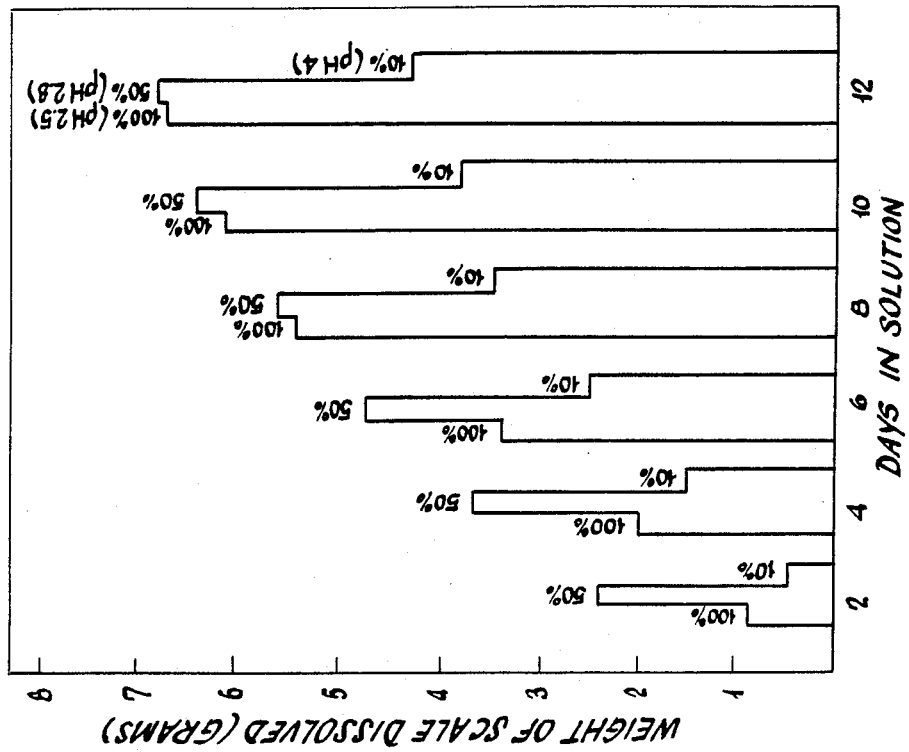
Fig. 2.
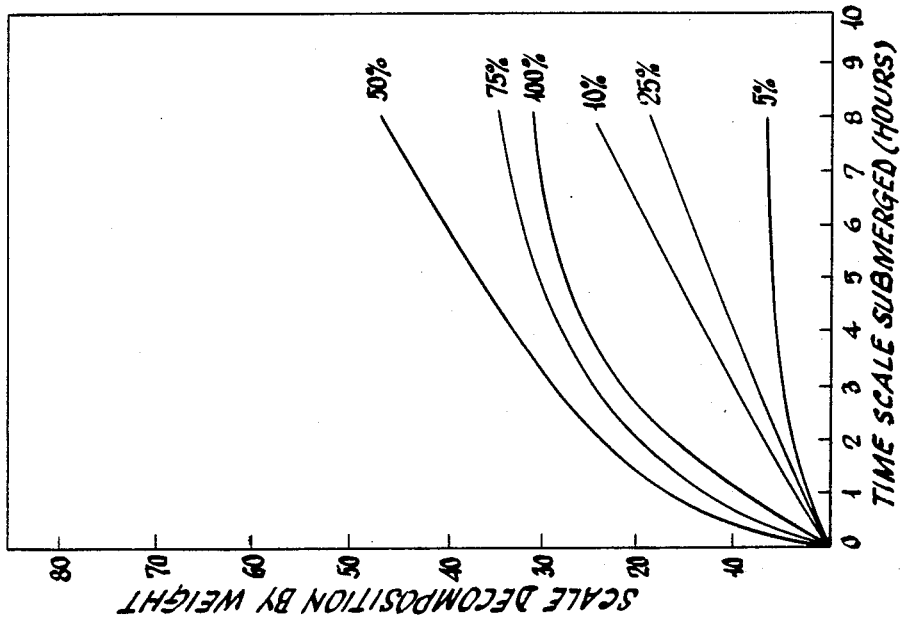
Fig. 1.

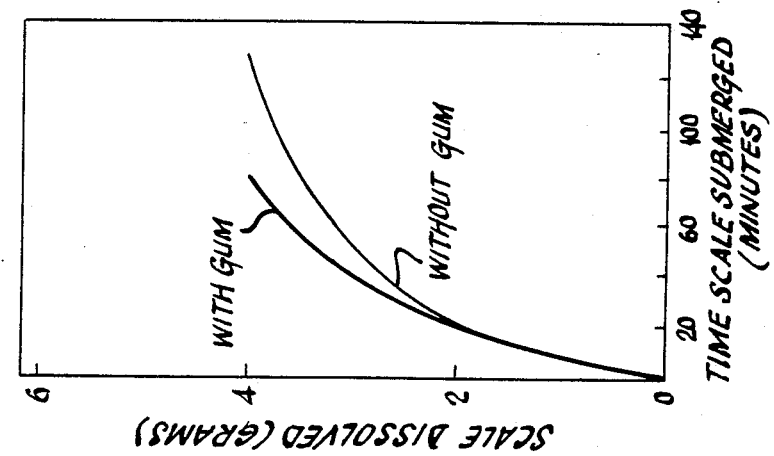
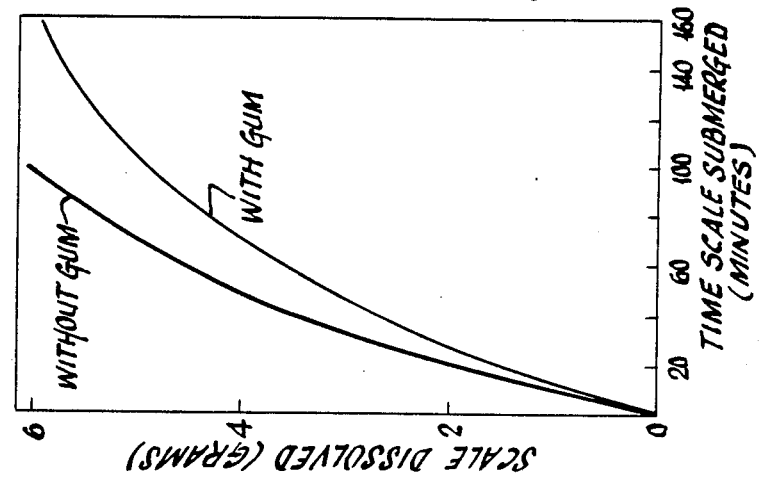
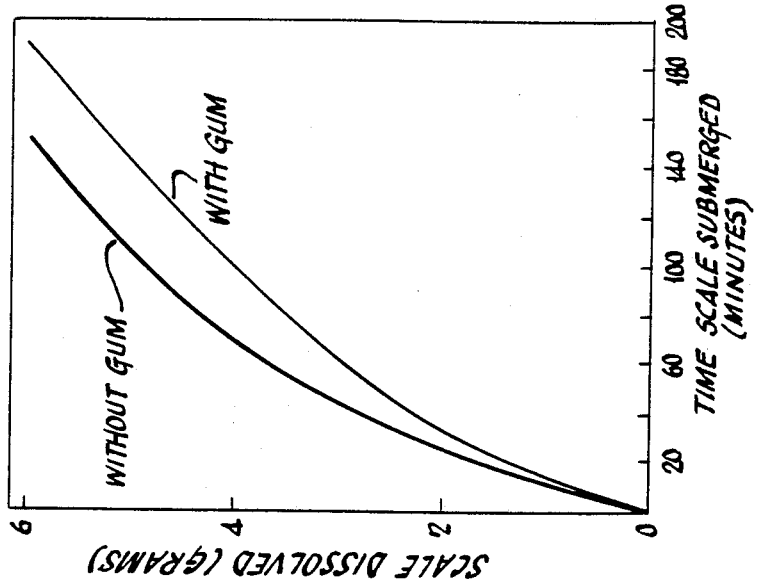

8.25% HYDROXYACETIC ACID CONCENTRATION 3.30% HYDROXYACETIC ACID CONCENTRATION

COMPOSITION FOR REMOVING SCALE FROM A SURFACE COMPRISING ALPHA-HYDROXY CARBOXYLIC ACID AND THICKENER

BACKGROUND OF THE INVENTION

The present invention is directed to a composition and its use in removing scale from a surface. More particularly, the composition includes an aliphatic alpha-hydroxy carboxylic acid, a gum or polymeric thickener and optionally sodium silicate.

The term "scale" generally refers to the accumulated deposits commonly found on water-exposed surfaces. Frequently encountered scale is often made up of carbonates or sulfates of calcium, sodium, potassium, or magnesium. The scale may also contain metal oxides, grease, oil or dirt. The consistency of the scale may vary from brittle and porous to tough and dense. The function of a descalant or descaling agent is to effectively remove these deposits.

Scale can be removed by either mechanically detaching the accumulation of deposits from the surface or by chemically treating the accumulation. A possible method for chemical treatment involves exposing the scale to a strong, inorganic acid solution such as hydrochloric, hydrofluoric or phosphoric acids. However, these acids are toxic and are difficult to handle.

Pierce in U.S. Pat. No. 3,294,689 discloses a synergistic sequestering composition for removing heavy metal ions from an aqueous solution. The composition consisted of a polyhydroxyl amine and one or more water soluble alpha-hydroxy acids. Pierce employs a basic pH and is particularly interested in removing ferrous, cupric, nickelous, aluminium and cadmium cations. He is also interested in removing combinations of cations such as ferrous and ferric; ferric and manganous; ferric, ferrous, manganous and cupric; and ferric, manganeous, cupric, zinc and nickelous.

Lesinski in U.S. Pat. No. 3,308,065 discloses a method for removing scale from metal surfaces. The method involves treating the scale with an aqueous, alkaline, saline solution. The solution employed contained at least one ammonium, amine or hydroxy alkyl amine salt of nitrilotriacetic acid, N-2-hydroxyethylamino diacetic acid, and alkylenepolyamine polycarboxylic acid or mixture thereof.

U.S. Pat. No. 3,699,047 of Petrey discloses a cooling system corrosion inhibitor which comprises a divalent metal ion such zinc, cadmium and mixtures thereof, a chelating agent and a modified lignosulfonate polymeric material. The chelating agent may be an alkylphosphonic acid or salt thereof, a polycarboxylic acid compound such as ethylene-diamine-tetraacetic acid, nitrilotriacetic acid, hydroxyalkyltetraacetic acids and sugar-acid chelates such as sodium heptagluconate such as discussed in Robertson, et al, U.S. Pat. No. 3,256,203.

However, there remains a need for a descalant which may be chiefly used for metal carbonate residues found in hard water which can remove scales effectively and safely without harm to the surface or to the worker.

SUMMARY OF THE INVENTION

The present invention is directed to a descaling composition comprising a (a) an aliphatic carboxylic acid of 2-5 carbon atoms having an alpha-substituted hydroxyl group; (b) a gum or synthetic polymeric thickener which is water soluble at about a pH of 3 or below; (c) sodium silicate and (d) water. The acid is between about 0.1 and 70.00 percent by weight of the composition, the gum or thickener is between 0.001 and 10 percent by weight of the composition, and the ratio by weight of sodium silicate to acid is from about 0 to 0.6:1. A preferred composition is that wherein the acid is alpha-hydroxyacetic acid, more preferably having a composition of 10 to 35 percent by weight. Also preferred are compositions where the gum is xanthan or tragacanth, preferably, xanthan particles coated with glyoxal as disclosed in applicant's U.S. Pat. No. 4,435,303. Particularly preferred is a composition wherein the xanthan coated with glyoxal is present in about 0.05 to 2 percent by weight in the composition.

A further preferred composition is that wherein the acid is alpha-hydroxyacetic acid, the gum is xanthan coated with glyoxal, the acid is between about 5 and 35 percent by weight of the composition, the gum is between about 0.25 and 0.30 percent by weight of the composition and the ratio by weight of sodium silicate to acid is between 0.2 and 0.03:1; further particularly preferred composition is that wherein the acid is about 33 percent by weight of the composition and the ratio by weight of sodium silicate to acid is about 0.03:1. These compositions may be employed for removing scale from a surface by contacting a scale removing effective amount of the composition with the scale. These compositions are particularly preferred for removing metal carbonates of hard water from surfaces.

The descaling composition may be prepared by (a) mixing a biopolymer gum or synthetic polymeric thickener which is water soluble at a pH of about 3 or below in water to obtain a homogeneous solution; (b) adding sodium silicate and (c) dissolving an aliphatic carboxylic acid of 2-5 carbon atoms having an alpha-substituted hydroxyl group. The preferred ingredients in this composition are those previously discussed.

BRIEF DESCRIPTION OF THE DRAWING

FIG. 1 is a graph of percent scale decomposition by weight versus time scale submerged.

FIG. 2 is a graph of the weight of scale dissolved versus days in solution.

FIGS. 3 to 7 are graphs of scale dissolved verses time scale submerged for various concentrations of solutions of the present invention.

DETAILED DESCRIPTION OF THE INVENTION

Figure 6:
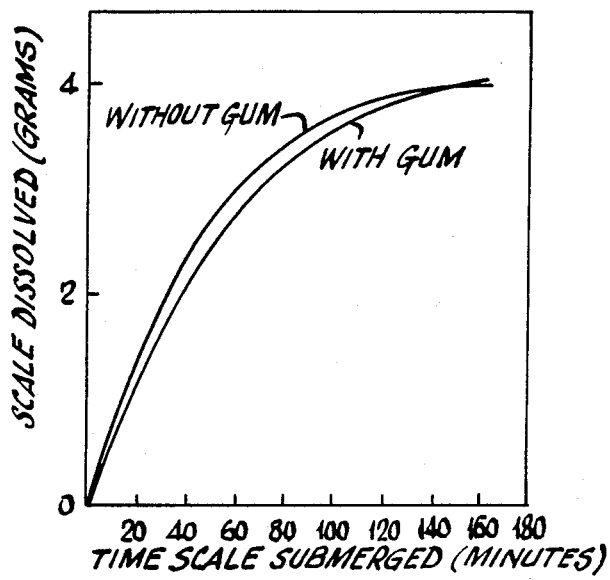

The present invention has been found to emulsify scale compositions chiefly due to metal carbonate residues of hard water. In the present invention, the gum or thickener is dispersed in the water and the alpha-hydroxy carboxylic acid is then mixed to obtain a solution. For alpha-hydroxyacetic acid, a 70 percent aqueous solution such as that available from duPont is employed. It has been observed that certain composition of water, hydroxyacetic acid and gum penetrates and emulsifies these scales at an unexpectedly fast rate.

Gums which may be employed must be stable at a pH of about three and below, because of the acidity of the alpha-hydroxy carboxylic acids. Gums generally are derived from natural sources and are well-known in the art. Gums having this property include Xanthan, which is a naturally occuring gum. It has been found that Kelzan S which is a xanthan gum that has been coated with glyoxal for use in dispersing in an aqueous medium is particularly useful. Kelzan S is commercially available from the KELCO Division of Merck & Co., Inc. There are other suitable gums commercially available, e.g., MEREZAN TYPE 8 from Meer Corporation. Synthetic polymeric thickeners which are known in the art may also be employed.

Sodium silicate may also be added. It serves as a metal conditioner and other metal conditioners compatible with the ingredients may also be employed. Various colorants or odorants may also be employed to make a more commercially desirable product. Of course, these additional additives must be compatible with the other ingredients.

It has been found that the order of mixing influences the properties of the resulting composition. The preferred order of mixing is to add the gum or polymeric thickener to water after thoroughly mixing to obtain a dissolved solution. The sodium silicate, if employed, and any colorants or odorants are added. Finally, the alpha-hydroxy aliphatic carboxylic acid is added with mixing until a homogenous solution is achieved. This solution is more viscous than a water solution would be without a gum or thickener. It is believed that the combination of the alpha-hydroxy carboxylic acid and the thickened aqueous solution synergistically reacts with the scale and removes it generally by dissolving it. At certain concentrations of acid and scale, however, a paste forms which can be readily removed by washing with water.

The present invention has the additional property of being substantially non-foaming. Thus, it may be used on pipes without clogging. The present invention may be employed in removing scale by contacting the composition with the scale containing surface. Scale may be removed from plumbing, boilers, coolers, heat exchangers, condensers, central heating systems, humidifiers, automobile engine radiators, piping found in engines and the like. The present invention may be employed by adding the composition to the water flowing by or otherwise in contact with surfaces to be descaled. Because of little or no foaming, this method is particularly advantageous. The scale may also be removed by direct application by using brushes, sprayers or methods known in the art for cleaning metal and other surfaces.

The present invention will be further illustrated by means of the following examples. It is to be understood, however, that these examples are merely for illustrative purposes and that the present invention is not meant to be limited thereby.

EXAMPLE 1

To 500 ml. of water was added two grams of Kelzan S which was dispersed in the water by mixing after the Kelzan S had dissolved; 250 ml. of a 70 percent aqueous solution of alpha-hydroxyacetic acid was added and mixed until a solution was obtained. The resulting composition was tested for its ability to dissolve scale. The composition of the scale was as follows: carbonates—56 percent, calcium—33 percent, potassium—4 percent, hydrogen from moisture—4 percent, silicate dioxide—2 percent, other—1 percent. Pieces of scale amounting to 4.0 grams (in 2.0 gram increments) were submerged in 100 mls. of the solution at 72 degrees F. The scale dissolved without a white film or emulsion over two days. Little foam was observed which disappeared with the addition of 25 mls. of water, and slight agitation.

EXAMPLE 2

A 5 gallon batch of descalant was prepared according to Example 1 in which the ratio of water to 70 percent aqueous solution of alpha-hydroxyacetic acid was 2:1 and Kelzan S was present in 0.27 percent by weight. The batch was dyed green by adding four drops of Colanyl green 8G, available from American Hoechst Industrial Dye Company. The batch was tested using the scale and submerging the test of Example 1. Portions of the batch were diluted with additional water. The results are given in Table 1 for the amount of scale dissolved for the composition of the batch diluted with water in volume to volume percent.

TABLE I

| Concentration descaling composition (%) | Time Submerged (hours) | Weight of Scale (grams) | 70% Acid present, initially (% weight) |
|---|---|---|---|
| 0 | 0 | 0.8 | 0.00 |
| 0 | 1 | 0.8 | 0.00 |
| 0 | 3 | 0.8 | 0.00 |
| 0 | 8 | 0.8 | 0.00 |
| 5 | 0 | 1.4 | 1.65 |
| 5 | 1 | 1.3 | 1.65 |
| 5 | 3 | 1.4 | 1.65 |
| 5 | 8 | 1.3 | 1.65 |
| 10 | 0 | 0.9 | 3.33 |
| 10 | 1 | 0.8 | 3.33 |
| 10 | 3 | 0.7 | 3.33 |
| 10 | 8 | 0.7 | 3.33 |
| 25 | 0 | 1.1 | 8.25 |
| 25 | 1 | 1.0 | 8.25 |
| 25 | 3 | 1.0 | 8.25 |
| 25 | 8 | 0.9 | 8.25 |
| 50 | 0 | 1.1 | 16.50 |
| 50 | 1 | 0.9 | 16.50 |
| 50 | 3 | 0.8 | 16.50 |
| 50 | 8 | 0.6 | 16.50 |
| 75 | 0 | 1.2 | 24.75 |
| 75 | 1 | 1.0 | 24.75 |
| 75 | 3 | 0.9 | 24.75 |
| 75 | 8 | 0.8 | 24.75 |
| 100 | 0 | 1.3 | 33.33 |
| 100 | 1 | 1.2 | 33.33 |
| 100 | 3 | 1.0 | 33.33 |
| 100 | 8 | 0.9 | 33.33 |

The results given in Table I are shown in the graph of FIG. 1. These results indicate that 50 percent concentration solution was most effective in dissolving scale respect to time.

EXAMPLE 3

To two hundred grams of water was added 0.54 grams of Kelzan S and mixed to obtain a solution. Ten grams of sodium silicate were dissolved and the resulting solution had a pH of 11.16. When 20 grams of 70 percent alpha-hydroxyacetic acid were added, the composition had a pH of 2.72; when, instead, 90 grams of 70 percent alpha-hydroxyacetic acid were added to the resulting solution, the pH of the composition was 1.91; and when, instead, 200 grams of 70 percent alpha-hydroxyacetic acid solution were added to the resulting solution, the pH of the composition was 1.49.

EXAMPLE 4

A 5 gallon descaling solution was prepared by mixing 0.115 pounds of Kelzan S with 28.3 pounds of water until a homogeneous solution was obtained. To the solution was added 0.425 pounds of sodium silicate and mixed until dissolved, followed by an addition of 14.1 pounds of 70 percent alpha-hydroxyacetic acid solution and 0.25 grams of Colanyl green 8G. The percent composition by weight of each of the components is as follows: water—65.91%, Kelzan S—0.268%, sodium silicate—0.99%, 32.84 percent alpha-hydroxyacetic acid 70 percent acid solution.

EXAMPLE 5

Two hundred ml. solutions containing by weight 10 percent, 50 percent and 100 percent, respectively, of 70 percent alpha-hydroxyacetic acid, 0.2 percent of Kelzan S and water to equal 200 ml. were tested for their ability to dissolve scale. The descaling solutions were kept at 72° F. The scale tested, which was submerged in the solution, weighed from 1.0 to 1.5 grams. The thickness of the scales tested were 1 mm. The composition of the scale was that of Example 1. The results are shown in FIG. 2 for the 10 percent, 50 percent and 100 percent based on 70 percent alpha-hydroxyacetic acid solution for the number of grams of scale dissolved by the solution for the number of days in the solution. The results indicate that the 50 percent solution is more effective than the 100 percent solution, which, in turn, is significantly more effective than the 10 percent solution. The measured pH is shown in parentheses.

EXAMPLE 6

Xanthan gum (0.27 gram) was dispersed in 66.89 grams of water to obtain a solution. 32.84 grams of 70 percent of alpha-hydroxyacetic acid solution was added and mixed to obtain a homogeneous solution. The weight percent of 70 percent alpha-hydroxyacetic acid was 32.84.

EXAMPLE 7

Xanthan gum (0.27 grams) was added to 65.91 grams of water and mixed to obtain a solution. Sodium silicate (0.99 grams) was added while stirring until dissolved. To the solution was added 32.84 grams of 70 percent alpha-hydroxyacetic acid and stirring continued until the solution was homogeneous. The weight percent of 70 percent alpha-hydroxyacetic acid in the homogeneous solution was 32.84.

EXAMPLE 8

Figure 7:
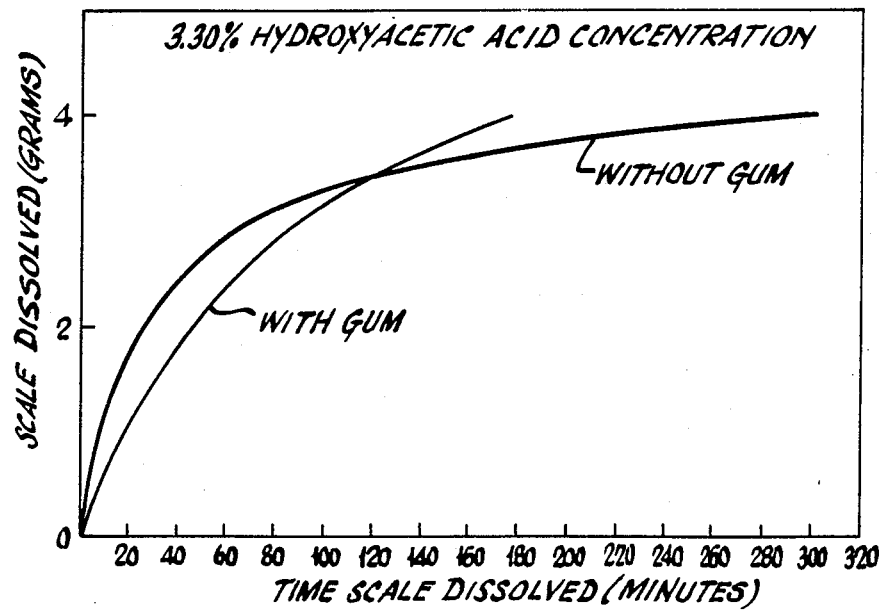

The solution of Example 6 was compared with a solution of Example 6 to which no gum had been dispersed, but additional water was added to obtain the same solution weight as in Example 6. The solutions with and without gum were diluted with water to various 70 percent alpha-hydroxyacetic acid concentrations. The results are shown in FIGS. 3 through 7, respectively, for the 4 grams of scale dissolved versus time the scale was submerged in the solution. The test procedure of Example 1 and the scale composition of Example 1 were employed. In FIG. 3 the amount of 70 percent alpha-hydroxyacetic acid present in the composition was 33 weight percent; for FIG. 4, 24.75 weight percent; for FIG. 5, 16.50 weight percent; for FIG. 6, 8.25 weight percent and for FIG. 7, 3.30 weight percent. The concentrations of 70 percent alpha-hydroxyacetic acid employed in FIGS. 3 through 6 were 33.33, 24.75, 16.50 and 8.25, respectively. For FIGS. 3 and 4, the solutions without gum dissolved the scale faster. For FIGS. 5 and 7, the solutions with gum were more effective, while for FIG. 6, the solutions with and without gum were about equally effective.

Having thus set forth the nature of the invention, what is claimed is:

1. A descaling composition consisting essentially of
(a) an aliphatic carboxylic acid of 2–5 carbon atoms having an alpha-substituted hydroxyl group;
(b) a natural gum or synthetic polymeric thickener which is water soluble at a pH of 3 or below;
(c) sodium silicate; and
(d) water;
wherein the acid is within the range of from about 5 to about 35 percent by weight of the composition, the gum or thickener is between about 0.001 and about 0.3 percent by weight of the composition; and the ratio by weight of sodium silicate to acid is within the range of 0 to 0.6.

2. A composition according to claim 1 wherein the acid is alpha-hydroxyacetic acid.

3. A composition according to claim 1 wherein the gum is xanthan.

4. A composition according to claim 3 wherein the xanthan is coated with glyoxal.

5. A composition according to claim 1 wherein the acid is alpha-hydroxyacetic acid, the gum is xanthan coated with glyoxal, the acid is between about 5 and 35 percent by weight of the composition, the gum is between about 0.25 and 0.30 percent by weight of the composition and the ratio by weight of sodium silicate to acid is between about 0.2 to 0.03:1.

6. A composition according to claim 1 wherein the acid is about 17.5 percent by weight of the composition.

7. A method for removing scale from a surface comprising contacting a scale removing effective amount of a composition according to claim 1 with the scale.

8. A method according to claim 7 wherein the acid is alpha-hydroxyacetic acid, the gum is xanthan coated with glyoxal, the acid is between about 5 and 35 percent by weight of the composition, the gum is between about 0.25 and 0.30 percent by weight of the composition and the ratio by weight of the sodium silicate to acid is between about 0.2 to 0.03:1.

9. A method according to claim 8 wherein the acid is about 33 percent by weight of the composition and the ratio by weight of sodium silicate to acid is about 0.03:1.

10. A method according to claim 9 wherein the scale is a metal carbonate of hard water.

11. A method for preparing a descaling composition comprising the steps of:
(a) mixing a gum or synthetic polymeric thickener which is water soluble at a pH of about 3 or below in water to obtain a homogeneous solution;
(b) adding sodium silicate to the homogeneous solution; and
(c) dissolving an aliphatic carboxylic acid of 2–5 carbon atoms having an alpha-substituted hydroxyl group in the resulting mixture of step (b).

12. A method according to claim 11 wherein the gum is tragacanth.

13. A method according to claim 11 wherein the gum is xanthan.

14. A method according to claim 11 wherein the gum is xanthan coated with glyoxal.

15. A method according to claim 11 wherein the acid is alpha-hydroxyacetic acid.

16. A descaling composition consisting essentially of
(a) alpha-hydroxyacetic acid;
(b) xanthan gum; and
(c) water
wherein the acid content of the composition is about 12 to about 35 percent by weight on a water free basis; and the gum content is within the range of 0.25 to 0.3 percent by weight.

* * * * *